United States Patent
Von Matern (10) Patent No.: US 12,281,497 B2
(45) Date of Patent: Apr. 22, 2025

(54) ARRANGEMENT FOR LOCK DEVICE, AND LOCK DEVICE COMPRISING ARRANGEMENT

(71) Applicant: ASSA ABLOY AB, Stockholm (SE)

(72) Inventor: Johan Von Matern, Täby (SE)

(73) Assignee: ASSA ABLOY AB, Stockholm (SE)

( * ) Notice: Subject to any disclaimer, the term of this patent is extended or adjusted under 35 U.S.C. 154(b) by 132 days.

(21) Appl. No.: 18/022,941

(22) PCT Filed: Aug. 25, 2021

(86) PCT No.: PCT/EP2021/073477
§ 371 (c)(1),
(2) Date: Feb. 23, 2023

(87) PCT Pub. No.: WO2022/043369
PCT Pub. Date: Mar. 3, 2022

(65) Prior Publication Data
US 2023/0323702 A1    Oct. 12, 2023

(30) Foreign Application Priority Data
Aug. 26, 2020  (SE) .................................. 2050989-9

(51) Int. Cl.
*E05B 47/06*      (2006.01)
*E05B 15/04*      (2006.01)
(Continued)

(52) U.S. Cl.
CPC .......... *E05B 47/0642* (2013.01); *E05B 15/04* (2013.01); *E05B 17/044* (2013.01);
(Continued)

(58) Field of Classification Search
CPC ............. E05B 15/04; E05B 2015/0417; E05B 2015/0455; E05B 2015/0496;
(Continued)

(56) References Cited

U.S. PATENT DOCUMENTS 6,427,505 B2 *  8/2002  Imedio Ocana .... E05B 47/0673
                                                     70/481
6,434,984 B1    8/2002  Juillerat et al.
                        (Continued)

FOREIGN PATENT DOCUMENTS

CN          108915392       11/2018
EP            1522659        4/2005
                    (Continued)

OTHER PUBLICATIONS

Official Action for Sweden Patent Application No. 2050989-9, dated Apr. 20, 2021, 8 pages.
(Continued)

*Primary Examiner* — Christopher J Boswell
(74) *Attorney, Agent, or Firm* — Schwegman Lundberg & Woessner, P.A.

(57) ABSTRACT

An arrangement (10) for a lock device (88a, 88b), the arrangement (10) comprising an input member (12, 106); a coupling member (26) movable between an uncoupled position (34) and a coupled position (80); an electromechanical actuator (28) comprising an actuating member (42) linearly movable between an uncoupling actuating position (44) and a coupling actuating position (78); and a torsion spring (30) having a first leg (62) and a second leg (64) movable away from each other against a deformation of the torsion spring (30), wherein the actuating member (42) is arranged to engage the first leg (62) and the second leg (64) is arranged to engage the coupling member (26) when the coupling member (26) is in the uncoupled position (34) and the actuating member (42) moves from the uncoupling actuating position (44) to the coupling actuating position (78). A lock device (88a, 88b) comprising an arrangement (10) is also provided.

17 Claims, 8 Drawing Sheets

(51) Int. Cl.
   *E05B 17/04* (2006.01)
   *E05B 47/00* (2006.01)
(52) U.S. Cl.
   CPC ...... *E05B 47/0012* (2013.01); *E05B 47/0638* (2013.01); *E05B 47/068* (2013.01); *E05B 2015/0417* (2013.01); *E05B 2015/0455* (2013.01); *E05B 2015/0496* (2013.01); *E05B 2047/0023* (2013.01); *E05B 2047/0026* (2013.01); *E05B 2047/0031* (2013.01); *E05B 47/0615* (2013.01)

(58) Field of Classification Search
   CPC .... E05B 17/044; E05B 17/045; E05B 17/046; E05B 47/0005; E05B 17/0638; E05B 17/0642; E05B 17/0676; E05B 17/068; E05B 2047/002; E05B 2047/0023; E05B 2047/0026; E05B 2047/0031
   See application file for complete search history.

(56) References Cited

U.S. PATENT DOCUMENTS

| | | | |
|---|---|---|---|
| 6,434,987 B1 | 8/2002 | Juillerat et al. | |
| 6,845,642 B2* | 1/2005 | Imedio Ocana | E05B 47/068 70/222 |
| 7,168,276 B2* | 1/2007 | Errani | E05B 47/0692 70/222 |
| 7,966,854 B2* | 6/2011 | Imedio Ocana | E05B 47/0642 192/69.62 |
| 8,516,865 B2* | 8/2013 | Ferreira Sanchez | E05B 47/0012 70/472 |
| 10,047,544 B2* | 8/2018 | Yen | E05B 47/0012 |
| 10,316,548 B2* | 6/2019 | Yuan | E05B 47/0012 |
| 10,597,902 B2* | 3/2020 | Guo | E05B 17/045 |
| 11,655,653 B1* | 5/2023 | Zhang | E05B 47/0012 70/277 |
| 2010/0257906 A1 | 10/2010 | Sorensen et al. | |
| 2024/0218704 A1* | 7/2024 | Caterino | E05B 47/0012 |

FOREIGN PATENT DOCUMENTS

| | | |
|---|---|---|
| EP | 2314809 | 4/2011 |
| FR | 2855202 | 11/2004 |
| FR | 2900774 | 11/2007 |
| WO | WO 2012/109713 | 8/2012 |

OTHER PUBLICATIONS

Official Action for Sweden Patent Application No. 2050989-9, dated Jul. 4, 2022, 34 pages.
International Search Report and Written Opinion for International (PCT) Patent Application No. PCT/EP2021/073477, dated Jan. 4, 2022, 15 pages.

* cited by examiner

ARRANGEMENT FOR LOCK DEVICE, AND LOCK DEVICE COMPRISING ARRANGEMENT

CROSS REFERENCE TO RELATED APPLICATIONS

This application is a national stage application under 35 U.S.C. 371 and claims the benefit of PCT Application No. PCT/EP2021/073477 having an international filing date of Aug. 25, 2021, which designated the United States, which PCT application claimed the benefit of Sweden Patent Application No. 2050989-9 filed Aug. 26, 2020, the disclosure of each of which are incorporated herein by reference.

TECHNICAL FIELD

The present disclosure generally relates to an arrangement for a lock device. In particular, an arrangement for a lock device and a lock device comprising such arrangement, are provided.

BACKGROUND

Some lock devices comprise an electromechanical actuator for moving a coupling member back and forth between an uncoupled position and a coupled position. In the uncoupled position of the coupling member, an input member may rotate freely, for example by means of a knob, a handle, or a key, and the rotation is not transmitted to a rotation of an output member. The lock device is thereby locked. In the coupled position, a rotation of the input member is transmitted to a rotation of the output member. The lock device can thereby be unlocked. The actuator may control the coupling member to move from the uncoupled position to the coupled position in response to a granted authorization request from a user. The authorization request may for example be input wirelessly.

EP 2314809 B1 discloses an engaging mechanism intended for electromechanical lock cylinders, including a slide which can be moved backwards and forwards by means of a spindle actuated by a motor, the slide bearing engaging pins which engage with an engagement disc during the forwards movement of the same. A cam is solidly connected to the engagement disc and the rotation thereof actuates the corresponding lock. As the slide moves, it is guided along rods provided in the corresponding cover of a rotor in which the assembly comprising the motor and the slide is housed. The coupling pins are associated with thrust springs which push the same into an emergency engaged position when said pins are located opposite the holes in the disc.

SUMMARY

One object of the present disclosure is to provide an arrangement for a lock device, which arrangement has a low power consumption.

A further object of the present disclosure is to provide an arrangement for a lock device, which arrangement has an energy efficient operation.

A still further object of the present disclosure is to provide an arrangement for a lock device, which arrangement has a less complicated design.

A still further object of the present disclosure is to provide an arrangement for a lock device, which arrangement has a cost-effective design.

A still further object of the present disclosure is to provide an arrangement for a lock device, which arrangement has a reliable operation.

A still further object of the present disclosure is to provide an arrangement for a lock device, which arrangement has a small size.

A still further object of the present disclosure is to provide an arrangement for a lock device, which arrangement solves several or all of the foregoing objects in combination.

A still further object of the present disclosure is to provide a lock device comprising an arrangement, which lock device solves one, several or all of the foregoing objects.

According to one aspect, there is provided an arrangement for a lock device, the arrangement comprising an input member rotatable about an input axis; an output member rotatable about an output axis; a coupling member movable between an uncoupled position, in which the coupling member does not transmit a rotation of the input member to a rotation of the output member, and a coupled position, in which the coupling member transmits a rotation of the input member to a rotation of the output member; an electromechanical actuator comprising an actuating member linearly movable between an uncoupling actuating position and a coupling actuating position; and a torsion spring having a first leg and a second leg movable away from each other against a deformation of the torsion spring, wherein the actuating member is arranged to engage the first leg and the second leg is arranged to engage the coupling member when the coupling member is in the uncoupled position and the actuating member moves from the uncoupling actuating position to the coupling actuating position.

The torsion spring comprising the first leg and the second leg allows the actuating member to move uninterruptedly regardless of whether or not the coupling member can move from the uncoupled position to the coupled position, e.g. regardless of whether or not the coupling member is blocked. If the coupling member cannot move from the uncoupled position to the coupled position, e.g. if the coupling member is not rotationally aligned with the output member of if the coupling member is otherwise prohibited from moving, the movement of the actuating member from the uncoupling actuating position to the coupling actuating position causes the first leg to move away from the second leg to deform the torsion spring. The actuating member may thereby push, or force in another way, the first leg to move away from the second leg. The actuating member can then be stopped in the coupling actuating position while the deformation of the torsion spring causes the second leg to force the coupling member from the uncoupled position towards the coupled position. The torsion spring thereby exerts a constant force on the coupling member without any power consumption.

If the coupling member can move from the uncoupled position to the coupled position, e.g. if the coupling member becomes rotationally aligned with the output member, the movement of the actuating member from the uncoupling actuating position to the coupling actuating position is transmitted by the torsion spring to a movement of the coupling member from the uncoupled position to the coupled position. The deformation of the torsion spring then causes the second leg to force the coupling member from the uncoupled position to the coupled position. When the coupling member adopts the coupled position, a user can manually rotate the input member, e.g. by means of a key or a handle, to thereby rotate the output member to unlock the lock device.

When the coupling member adopts the uncoupled position, the output member is uncoupled from the input member. When the coupling member adopts the coupled position, the coupling member establishes a coupling between the input member and the output member. The coupling member may be coupled directly or indirectly to the output member when the coupling member adopts the coupled position. The arrangement thus constitutes a coupling arrangement and functions as a clutch. The arrangement provides a very energy efficient way to transfer a movement of the actuating member from the uncoupling actuating position to the coupling actuating position to a movement of the coupling member from the uncoupled position to the coupled position, while also allowing the actuating member to move from the uncoupling actuating position to the coupling actuating position if the coupling member is prevented from moving from the uncoupled position to the coupled position.

Since the torsion spring comprises a first leg and a second leg, the torsion spring constitutes a pinching spring. The torsion spring may be a helical torsion spring comprising a helix. The helix may comprise at least one half turn, such as at least one full turn, such as at least three full turns.

The torsion spring may provide a substantially constant force. The torsion spring may be configured such that a force exerted by the second leg on the coupling member when the actuating member adopts the coupling actuating position and the coupling member adopts the coupled position is at least 90%, such as at least 95%, of a force exerted by the second leg on the coupling member when the actuating member adopts the coupling actuating position and the coupling member adopts the uncoupled position.

Each of the input member and the output member may be hollow and the coupling member may be configured to enter a respective opening of the input member and the output member. Alternatively, the coupling member may be hollow and each of the input member and the output member may be configured to enter first and second openings of the coupling member. In the latter case, the first and second openings may either be blind holes or may join in a common cavity.

The input member may be an input shaft, the coupling member may be a coupling shaft and/or the output member may be an output shaft. The input axis and the output axis may be concentric. In this case, the input axis and the output axis may thus be constituted by a common rotation axis.

The torsion spring may be rotatable about a spring axis. In case the torsion spring comprises a helix, the helix may be centered with respect to the spring axis. The arrangement may comprise a spring pin defining the spring axis. In this case, the torsion spring may be rotationally supported by the spring pin.

The actuating member may be linearly movable along an actuating axis. In this case, the actuating axis may be substantially perpendicular to, or perpendicular to, the spring axis. Alternatively, the spring axis may be inclined, such as 45 degrees, to the actuating axis. In any case, the coupling member may be arranged between the input member and the output member along the actuating axis. Alternatively, the input member may be arranged between a protruding part of the coupling member and the output member in the uncoupled position.

The actuating member may be arranged to engage the first leg at a first engagement point. In this case, the first engagement point and the actuating axis may lie in a plane substantially parallel with, or parallel with, the spring axis.

Alternatively, or in addition, the actuating member may be arranged to engage the second leg at a second engagement point. In this case, the second engagement point and the actuating axis may lie in a plane substantially parallel with, or parallel with, the spring axis. In any case, a line between the first engagement point and the second engagement point may be substantially parallel with, or parallel with, the actuating axis.

The coupling member may be linearly movable between the uncoupled position and the coupled position along a coupling axis. In this case, the coupling axis may be substantially perpendicular to, or perpendicular to, the spring axis.

The actuating member may be positioned between the spring axis and the coupling member. A shortest distance between the spring axis and the actuating axis may be 30% to 70%, such as 40% to 60%, of a shortest distance between the spring axis and the coupling axis.

The actuator may comprise a lead screw. In this case, the actuating member may be a nut engaging the lead screw. The lead screw may be rotatable about the actuating axis. The use of a lead screw and a nut engaging the lead screw enables a first engagement point between the actuating member and the first leg, and/or a second engagement point between the actuating member and the second leg, to be provided close to the actuating axis. In this way, a "sticky drawer effect", i.e. a tilting torque between the actuating member and the lead screw, can be reduced and the energy efficiency can thereby be improved.

The actuator may further comprise an electric motor. In this case, the electric motor may be arranged to rotationally drive the lead screw. The electric motor may comprise a rotatable motor shaft.

The actuator may further comprise a transmission. The transmission may be arranged to transmit a rotation of the motor shaft to a rotation of the lead screw. According to one example, the transmission comprises two or more gear wheels.

The actuating member may be arranged to engage the first leg at a first engagement point. In this case, a distance between the first engagement point and the lead screw may be less than a diameter of the lead screw. Alternatively, or in addition, the actuating member may be arranged to engage the second leg at a second engagement point. In this case, a distance between the second engagement point and the lead screw may be less than a diameter of the lead screw. In these ways, a "sticky drawer effect" between the actuating member and the lead screw can be greatly reduced and the energy efficiency can thereby be greatly improved. The diameter of the lead screw may be a diameter of a major thread of the lead screw.

The actuator according to the present disclosure may however be a linear actuator of other types than using a lead screw to engage a nut. Examples of such linear actuators include synchronous linear motors, three-phase linear induction motors, piezoelectric motors, hydraulic actuators and pneumatic actuators.

The coupling member may be configured to engage the output member by means of a shape fit when the coupling member adopts the coupled position.

To this end, the coupling member may be a spline shaft or may comprise a polygonal cross-sectional profile. The output member may comprise a corresponding shape for establishing the shape fit with the coupling member. The coupling member may comprise a male profile and the output member may comprise a female profile for receiving the coupling member.

Alternatively, the output member may comprise a male profile and the coupling member may comprise a female profile for receiving the output member.

The coupling member may engage the input member by means of a shape fit. The coupling member may engage the input member by means of the shape fit both in the uncoupled position and in the coupled position. The coupling member may thus be slidable relative to the input member. The coupling member may comprise a male profile and the input member may comprise a female profile for receiving the coupling member. Alternatively, the input member may comprise a male profile and the coupling member may comprise a female profile for receiving the input member.

The first leg and the second leg may be substantially parallel, or parallel, when the actuating member adopts the uncoupling actuating position and the coupling member adopts the uncoupled position.

Each of the first leg and the second leg may be substantially straight, or straight. Each of the first leg and the second leg may be straight between the actuating member and the coupling member.

The actuating member may be arranged to engage the second leg and the first leg may be arranged to engage the coupling member when the coupling member is in the coupled position and the actuating member moves from the coupling actuating position to the uncoupling actuating position. The movement of the actuating member from the coupling actuating position to the uncoupling actuating position thereby causes the coupling member to move from the coupled position to the uncoupled position.

The coupling member may comprise a protruding coupling part. In this case, the protruding coupling part may be arranged between the first leg and the second leg. The protruding coupling part may for example be a collar or other structure than can be engaged by the first and second legs.

The actuating member may comprise a protruding actuating part. In this case, the protruding actuating part may be arranged between the first leg and the second leg. The protruding actuating part may protrude in a direction substantially parallel with, or parallel with, the spring axis and/or in a direction substantially perpendicular to, or perpendicular to, the actuating axis.

The protruding actuating part may for example be a pin. A width of the protruding actuating part in a direction parallel with the actuating axis may be substantially the same as (e.g. differ less than 5% from), or the same as, a width of the protruding coupling part in a direction parallel with the coupling axis.

The arrangement may further comprise a control system, the control system comprising at least one data processing device and at least one memory having a computer program stored thereon, the computer program comprising program code which, when executed by the at least one data processing device, causes the at least one data processing device to perform the steps of evaluating an authorization request; and commanding the actuator to drive the actuating member from the uncoupling actuating position to the coupling actuating position in response to a granted evaluation of the authorization request. The computer program may further comprise program code which, when executed by the at least one data processing device, causes the at least one data processing device to perform, or command performance of, various steps as described herein.

The control system may further comprise a receiving unit, such as an antenna, for receiving the authorization request.

The control system may be configured to determine whether or not authorization should be granted based on the authorization request. If access is granted, e.g. if a valid credential is presented, the actuator is commanded to drive the actuating member from the uncoupling actuating position to the coupling actuating position.

The arrangement may further comprise a printed circuit board, PCB. The control system may be provided on the PCB.

According to a further aspect, there is provided a lock device comprising an arrangement according to the present disclosure. The lock device may be an electromechanical lock device. The lock device may comprise a DIN cylinder or a Scandinavian cylinder.

The lock device may be an energy harvesting lock device. To this end, the lock device may comprise an electromagnetic generator arranged to be driven by rotation of the input member to thereby generate electric energy. The actuator may be electrically powered by energy harvested by the generator. Alternatively, or in addition, the lock device may comprise a battery and the actuator may be electrically powered by the battery. The lock device may be configured to harvest electric energy sufficient for the actuator to drive the actuating member from the uncoupling actuating position to the coupling actuating position and back to the uncoupling actuating position.

The lock device may further comprise a manually operable member. In this case, the input member can be rotated by means of manual rotation of the manually operable member. The manually operable member may be fixed to the input member, arranged to drive the input member, or connectable to the input member. The manually operable member may for example be a knob, a lever or a physical key.

The lock device may further comprise a locking member. The locking member may be moved from a locking position to an unlocking position by rotation of the output member. The locking member may be fixed to the output member or arranged to be driven by the output member.

According to a further aspect, there is provided a method of controlling a lock device, the method comprising providing a lock device according to the present disclosure; and driving the actuating member from the uncoupling actuating position to the coupling actuating position in response to a granted authorization request from a user. If the authorization request is not granted or if no authorization request is received, the actuating member remains in the uncoupling actuating position. The method may further comprise driving the actuating member from the coupling actuating position to the uncoupling actuating position after expiration of a time limit, e.g. 5 seconds.

BRIEF DESCRIPTION OF THE DRAWINGS

Further details, advantages and aspects of the present disclosure will become apparent from the following description taken in conjunction with the drawings, wherein.

DETAILED DESCRIPTION

In the following, an arrangement for a lock device and a lock device comprising such arrangement, will be described. The same or similar reference numerals will be used to denote the same or similar structural features.

Figure 1:
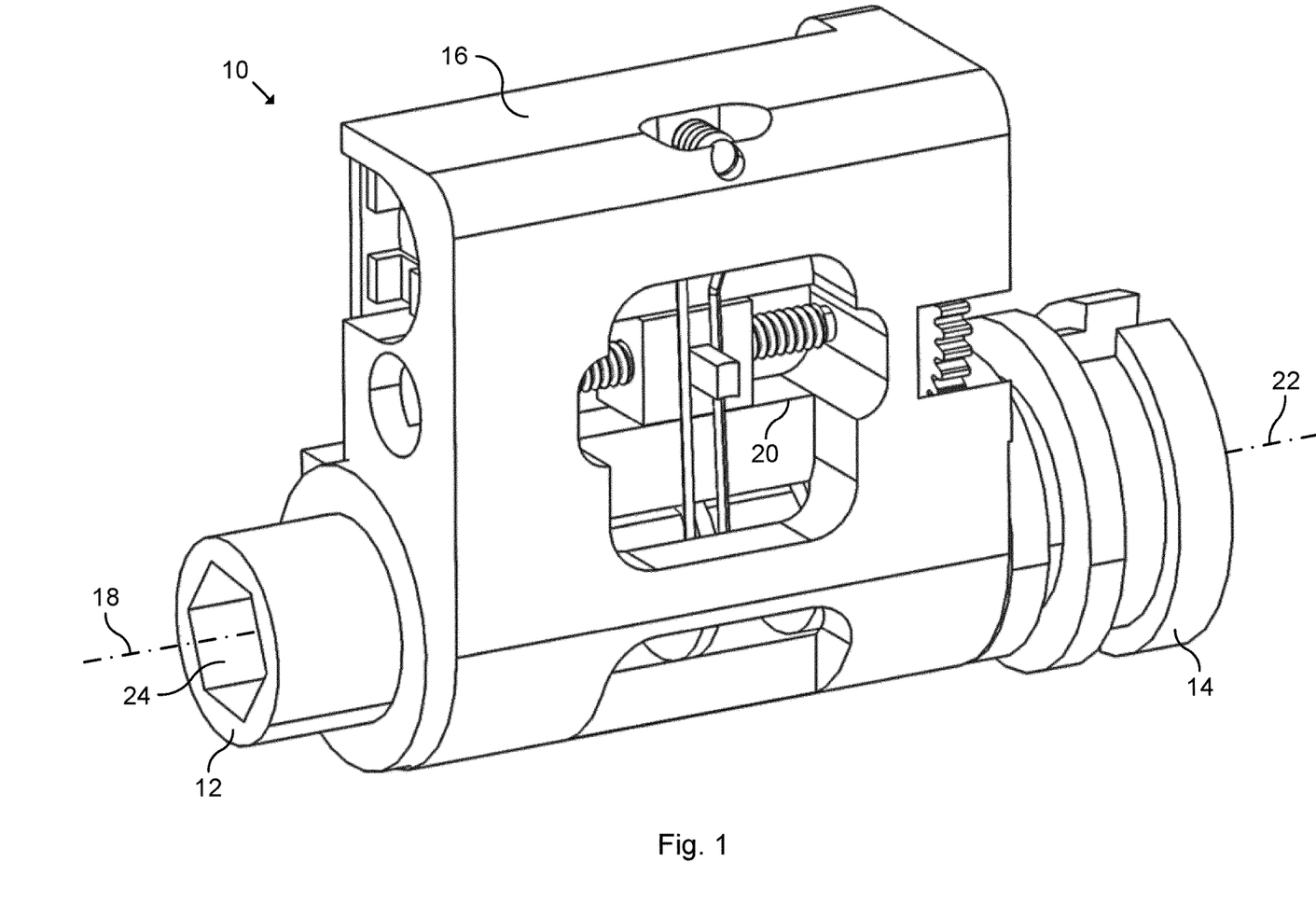
FIG. 1: schematically represents a perspective side view of an arrangement for a lock device.

FIG. 1 schematically represents a perspective side view of an arrangement 10 for a lock device. The arrangement 10 comprises an input shaft 12 and an output shaft 14. The arrangement 10 further comprises a housing 16. The input shaft 12 and the output shaft 14 protrude from opposite sides of the housing 16. The input shaft 12 and the output shaft 14 are examples of an input member and an output member, respectively, according to the present disclosure.

The input shaft 12 is rotatable about an input axis 18. The output shaft 14 is rotatable about an output axis 22. In this example, the input axis 18 and the output axis 22 are concentric, i.e. constituted by a common rotation axis. The housing 16 comprises a track 20. The track 20 extends in parallel with the input axis 18. The input shaft 12 comprises an input opening 24.

Figure 2:
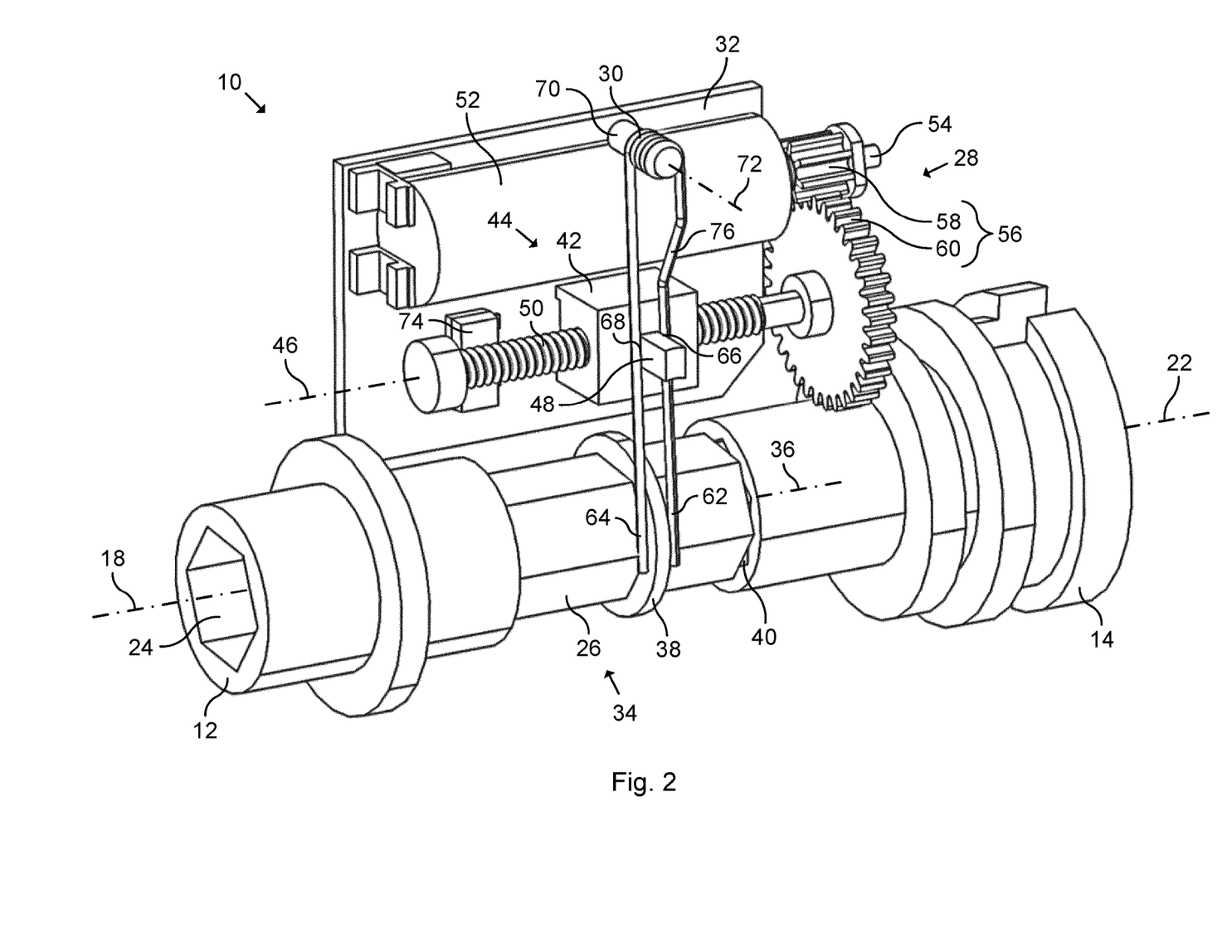
FIG. 2: schematically represents a partial perspective side view of the arrangement.

FIG. 2 schematically represents a partial perspective side view of the arrangement 10. In FIG. 2, the housing 16 is removed to improve visibility. The arrangement 10 further comprises a coupling shaft 26, an electromechanical actuator 28 and a torsion spring 30. The coupling shaft 26 is one example of a coupling member according to the present disclosure. The arrangement 10 comprises a stationary structure, here exemplified as a plate 32. The plate 32 in FIG. 2 is a circuit board.

In FIG. 2, the coupling shaft 26 is in an uncoupled position 34. The coupling shaft 26 is linearly movable along a coupling axis 36. The coupling shaft 26 is arranged between the input shaft 12 and the output shaft 14 along the coupling axis 36. In this example, the coupling axis 36 is concentric with the input axis 18 and the output axis 22.

The coupling shaft 26 comprises a collar 38. The collar 38 is one example of a protruding coupling part according to the present disclosure. The collar 38 is circular in a plane perpendicular to the coupling axis 36. Except for the collar 38, the coupling shaft 26 has a polygonal exterior profile along its length, here a hexagonal exterior profile. The input opening 24 of the input shaft 12 has a corresponding interior profile. The polygonal profiles of the input shaft 12 and the coupling shaft 26 form one example of a shape fit between the input shaft 12 and the coupling shaft 26. The coupling shaft 26 is received in the input opening 24 of the input shaft 12. The coupling shaft 26 is slidable relative to the input shaft 12 along the coupling axis 36 while being maintained connected to the input shaft 12 by means of the shape fit. The input shaft 12 and the coupling shaft 26 thus rotate in common. In the uncoupled position 34, a rotation of the coupling shaft 26 about the coupling axis 36 is not transmitted to a rotation of the output shaft 14.

The output shaft 14 comprises an output opening 40. The output opening 40 has an interior profile corresponding to the exterior profile of the coupling shaft 26.

The actuator 28 comprises a nut 42. The nut 42 is one example of an actuating member according to the present disclosure. The actuator 28 can alternatively employ an actuating member other than a nut. In FIG. 2, the nut 42 is in an uncoupling actuating position 44. The nut 42 is linearly movable along an actuating axis 46.

The nut 42 of this specific example has a cuboidal shape. The nut 42 engages the track 20 of the housing 16. In this way, the housing 16 prevents the nut 42 from rotating about the actuating axis 46.

The nut 42 comprises an actuating pin 48. The actuating pin 48 is one example of a protruding actuating part according to the present disclosure. The actuating pin 48 protrudes from the nut 42 in a direction perpendicular to the actuating axis 46. A width of the actuating pin 48 in a direction parallel with the actuating axis 46 is the same as a width of the collar 38 in a direction parallel with the coupling axis 36.

The actuator 28 of this example further comprises a lead screw 50. The nut 42 threadingly engages the lead screw 50. The lead screw 50 is rotatable about the actuating axis 46.

The actuator 28 of this example further comprises an electric motor 52. The electric motor 52 comprises a rotatable motor shaft 54. The electric motor 52 is secured to the plate 32.

The actuator 28 of this example further comprises a transmission 56. The transmission 56 comprises a first gear wheel 58 and a second gear wheel 60 meshing with the first gear wheel 58. The first gear wheel 58 is fixed to the motor shaft 54. The second gear wheel 60 is fixed to the lead screw 50. The transmission 56 is thus arranged to transmit a rotation of the motor shaft 54 to a rotation of the lead screw 50. The electric motor 52 is thereby arranged to drive the lead screw 50 to rotate about the actuating axis 46.

The torsion spring 30 comprises a first leg 62 and a second leg 64. The first leg 62 and the second leg 64 are movable away from each other against a deformation of the torsion spring 30. In the state of the torsion spring 30 in FIG. 2, the torsion spring 30 is deformed such that the first leg 62 and the second leg 64 pinches each of the actuating pin 48 and the collar 38. The first leg 62 engages the actuating pin 48 at a first engagement point 66. The second leg 64 engages the actuating pin 48 at a second engagement point 68, on an opposite side of actuating pin 48 with respect to the first engagement point 66.

When the nut 42 is in the uncoupling actuating position 44 according to FIG. 2, the first leg 62 and the second leg 64 hold the coupling shaft 26 in the uncoupled position 34. In the uncoupled position 34, the coupling shaft 26 is separated from the output shaft 14 along the coupling axis 36. A rotation of the input shaft 12 is transmitted to a rotation of the coupling shaft 26. However, a rotation of the coupling shaft 26 is not transmitted to a rotation of the output shaft 14 when the coupling shaft 26 is in the uncoupled position 34. The output shaft 14 is uncoupled from the input shaft 12 when the coupling shaft 26 is in the uncoupled position 34. The lock device is thus locked.

The torsion spring 30 of the example in FIG. 2 is a helical torsion spring comprising a helix. The arrangement 10 further comprises a spring pin 70. The helix of the torsion spring 30 is wound around the spring pin 70, here almost five full turns. The spring pin 70 thereby supports the torsion spring 30. The spring pin 70 and the helix each defines a spring axis 72. The torsion spring 30 is rotatable about the spring axis 72. The nut 42 is positioned between the spring axis 72 and the coupling shaft 26.

The arrangement 10 further comprises two position sensors 74. In FIG. 2, only one position sensor 74 can be seen. By means of the position sensors 74, a position of the nut 42 can be determined. The position sensors 74 of this example are Hall effect sensors. A magnet (not visible) is provided on the nut 42. The position sensors 74 sense proximity of the nut 42 by measuring a magnetic field from the magnet.

Each of the actuating axis 46 and the coupling axis 36 is perpendicular to the spring axis 72. As shown in FIG. 2, the first engagement point 66, the second engagement point 68 and the actuating axis 46 lie in a plane parallel with the spring axis 72. Moreover, the first engagement point 66 and the second engagement point 68 are positioned close to the actuating axis 46. This contributes to avoid the "sticky drawer effect" of the nut 42. A line between the first engagement point 66 and the second engagement point 68 is parallel with the actuating axis 46. The actuating pin 48 protrudes in a direction parallel with the spring axis 72.

Each of the first leg 62 and the second leg 64 is straight between the nut 42 and the coupling shaft 26. In this example, the first leg 62 comprises a bent portion 76. Except for the bent portion 76, the first leg 62 is straight between the helix and the coupling shaft 26. The first leg 62 is thus substantially straight. The second leg 64 of this example is straight between the helix and the coupling shaft 26. As shown in FIG. 2, in the uncoupling actuating position 44 of the nut 42 and the uncoupled position 34 of the coupling shaft 26, the first leg 62 and the second leg 64 are parallel.

In order to couple the input shaft 12 to the output shaft 14, the electric motor 52 is driven to rotate the lead screw 50, e.g. in response to a granted evaluation of an authorization request. The rotation of the lead screw 50 causes the nut 42 to move linearly along the actuating axis 46 (to the right in FIG. 2) from the uncoupling actuating position 44 to a coupling actuating position.

Figure 3:
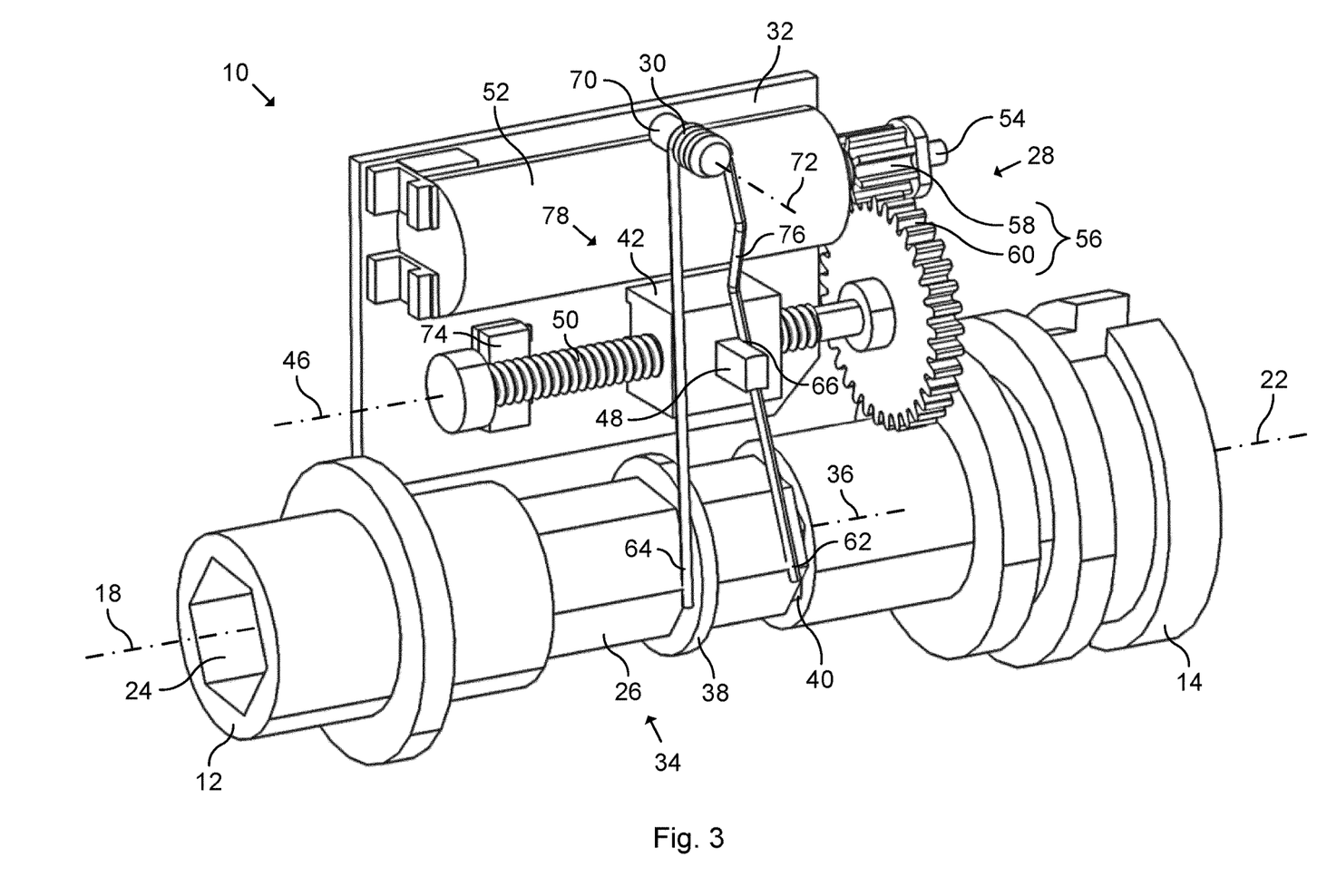
FIG. 3: schematically represents a partial perspective side view of the arrangement after movement of an actuating member from an uncoupling actuating position to a coupling actuating position.

FIG. 3 schematically represents a partial perspective side view of the arrangement 10 after movement of the nut 42 from the uncoupling actuating position 44 to the coupling actuating position 78. This movement of the nut 42 can be effected with very low power consumption. In FIG. 3, a valid credential has been presented and the actuator 28 has thereby driven the nut 42 to the coupling actuating position 78.

During movement of the nut 42 from the uncoupling actuating position 44 in FIG. 2 to the coupling actuating position 78 in FIG. 3, the actuating pin 48 pushes the first leg 62 away from the second leg 64. The torsion spring 30 is thereby further deformed. Due to the deformation of the torsion spring 30, the second leg 64 pushes on the collar 38 and thereby exerts a constant force on the coupling shaft 26 (to the right in FIG. 3). Once the nut 42 has moved to the coupling actuating position 78, the electric motor 52 is stopped. Thus, no more electric energy needs to be supplied to the arrangement 10 when adopting the state in FIG. 3.

Since the coupling shaft 26 is not rotationally aligned with the output shaft 14 in FIG. 3, the coupling shaft 26 cannot enter the output opening 40 to engage the output shaft 14. The nut 42 can however move from the uncoupling actuating position 44 to the coupling actuating position 78 regardless of whether or not the coupling shaft 26 is rotationally aligned with the output shaft 14.

Figure 4:
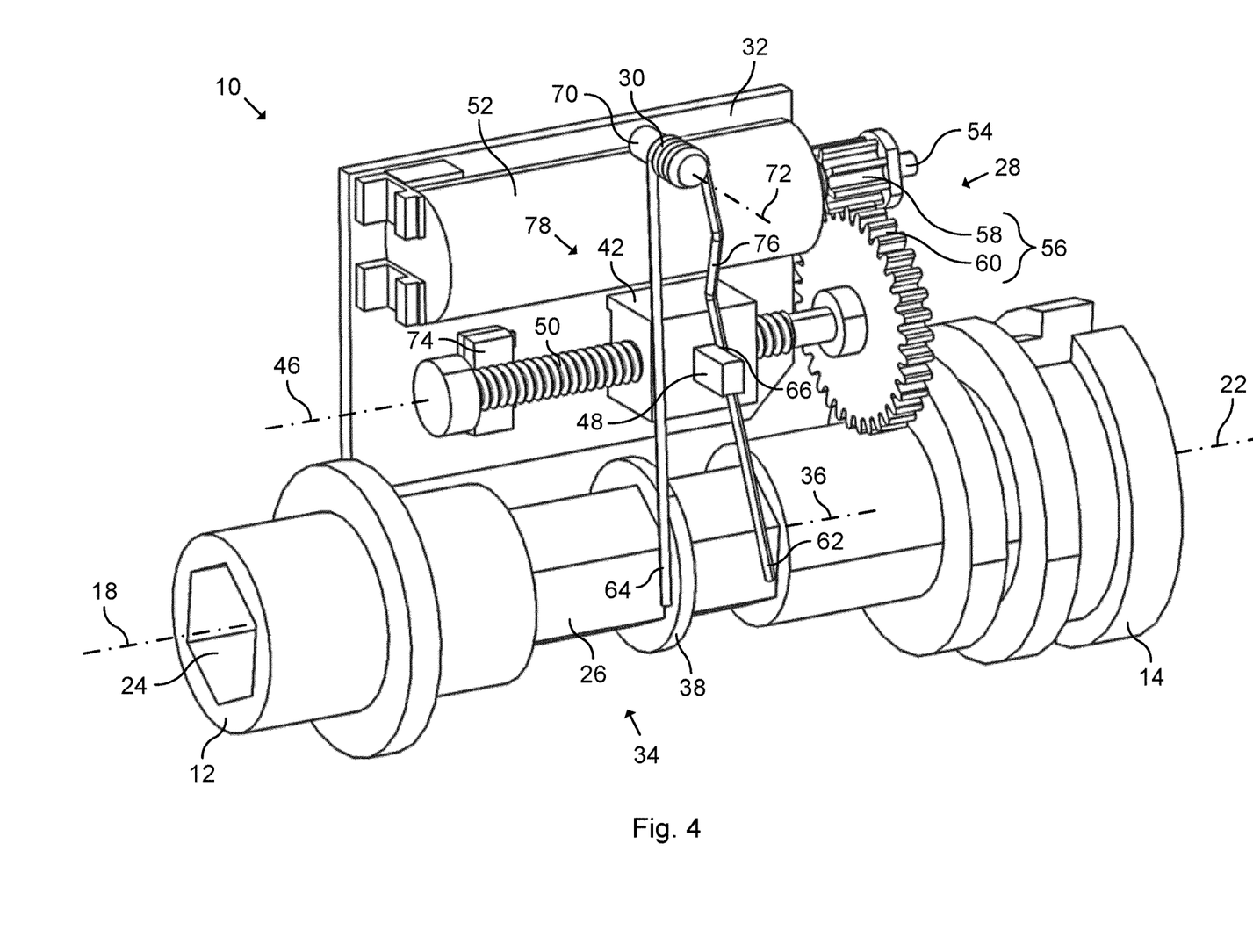
FIG. 4: schematically represents a partial perspective side view of the arrangement after rotation of an input member and a coupling member.

FIG. 4 schematically represents a partial perspective side view of the arrangement 10. In FIG. 4, the input shaft 12 is rotated about the input axis 18 such that also the coupling shaft 26 is rotated to align with the output shaft 14. The rotation of the input shaft 12 may be effected by manual rotation of a manually operable member, such as a knob, a lever or a physical key (not shown). Once the coupling shaft 26 is aligned with the output shaft 14 according to FIG. 4, in this example when the polygonal exterior profile of the coupling shaft 26 aligns with the polygonal interior profile of the output opening 40 of the output shaft 14, the second leg 64 pushes the coupling shaft 26 into the output shaft 14. The coupling shaft 26 thereby moves from the uncoupled position 34 to a coupled position.

Figure 5:
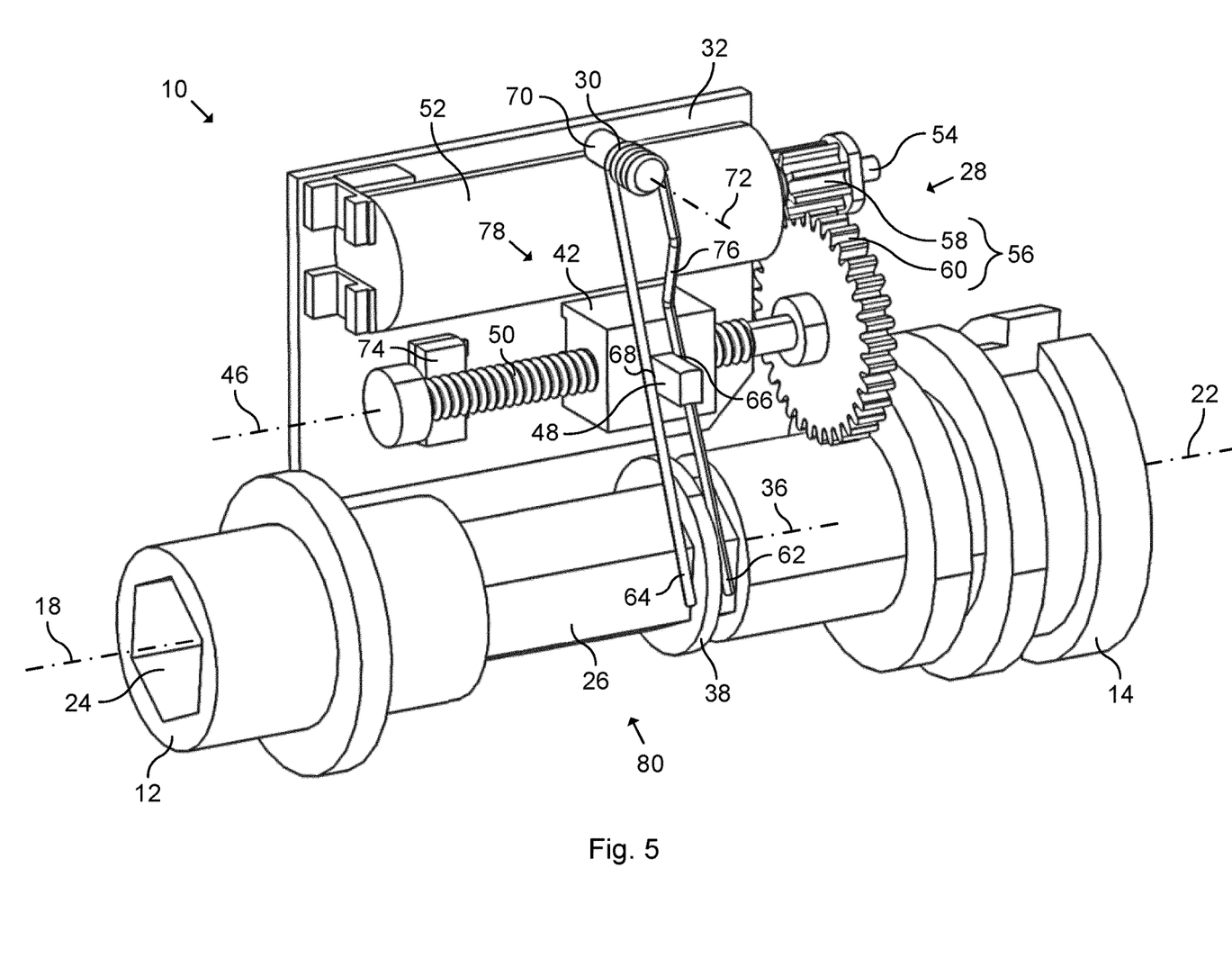
FIG. 5: schematically represents a partial perspective side view of the arrangement after movement of the coupling member from an uncoupled position to a coupled position.

FIG. 5 schematically represents a partial perspective side view of the arrangement 10 after movement of the coupling shaft 26 from the uncoupled position 34 to the coupled position 80. The movement of the nut 42 from the uncoupling actuating position 44 to the coupling actuating position 78 is transmitted by the torsion spring 30 to the movement of the coupling shaft 26 from the uncoupled position 34 to the coupled position 80.

As shown in FIG. 5, the first leg 62 and the second leg 64 are parallel between the actuating pin 48 and the collar 38 when the nut 42 adopts the coupling actuating position 78 and the coupling shaft 26 adopts the coupled position 80. The first leg 62 and the second leg 64 thereby pinches each of actuating pin 48 and the collar 38. A force exerted by the second leg 64 on the collar 38 in FIG. 5 (nut 42 in coupling actuating position 78 and coupling shaft 26 in coupled position 80) is at least 90% of a force exerted by the second leg 64 on the collar 38 in FIG. 4 (nut 42 in coupling actuating position 78 and coupling shaft 26 in uncoupled position 34). The torsion spring 30 thus provides a substantially constant force.

When the coupling shaft 26 adopts the coupled position 80, the coupling shaft 26 enters the output opening 40 and thereby engages the output shaft 14 by means of a shape fit. When the coupling shaft 26 moves between the uncoupled position 34 and the coupled position 80, the coupling shaft 26 moves relative to the input shaft 12 but the shape fit therebetween is maintained. The coupling shaft 26 thereby establishes a coupling between the input shaft 12 and the output shaft 14 when the coupling shaft 26 adopts the coupled position 80. A rotation of the input shaft 12 about the input axis 18 is now transmitted by the coupling shaft 26 to a rotation of the output shaft 14 about the output axis 22. When the coupling shaft 26 is in the coupled position 80, a user can rotate the output shaft 14 by rotating the input shaft 12, e.g. by means of a manually operable member, to unlock the lock device.

The electric motor 52 may be automatically commanded to drive the lead screw 50 in an opposite direction after expiration of a certain time limit, e.g. five seconds. The rotation of the lead screw 50 thereby causes the nut 42 to move linearly along the actuating axis 46 (to the left in FIG. 5) from the coupling actuating position 78 back to the uncoupling actuating position 44.

When the nut 42 moves from the coupling actuating position 78 back to the uncoupling actuating position 44, the actuating pin 48 pushes the second leg 64 at the second engagement point 68 (to the left in FIG. 5). Since the coupling shaft 26 is not prevented to move from the coupled position 80 back to the uncoupled position 34, the movement of the second leg 64 causes the first leg 62 to push the collar 38 to move the coupling shaft 26 from the coupled position 80 back to the uncoupled position 34. The lock device is thereby locked again.

Figure 6:
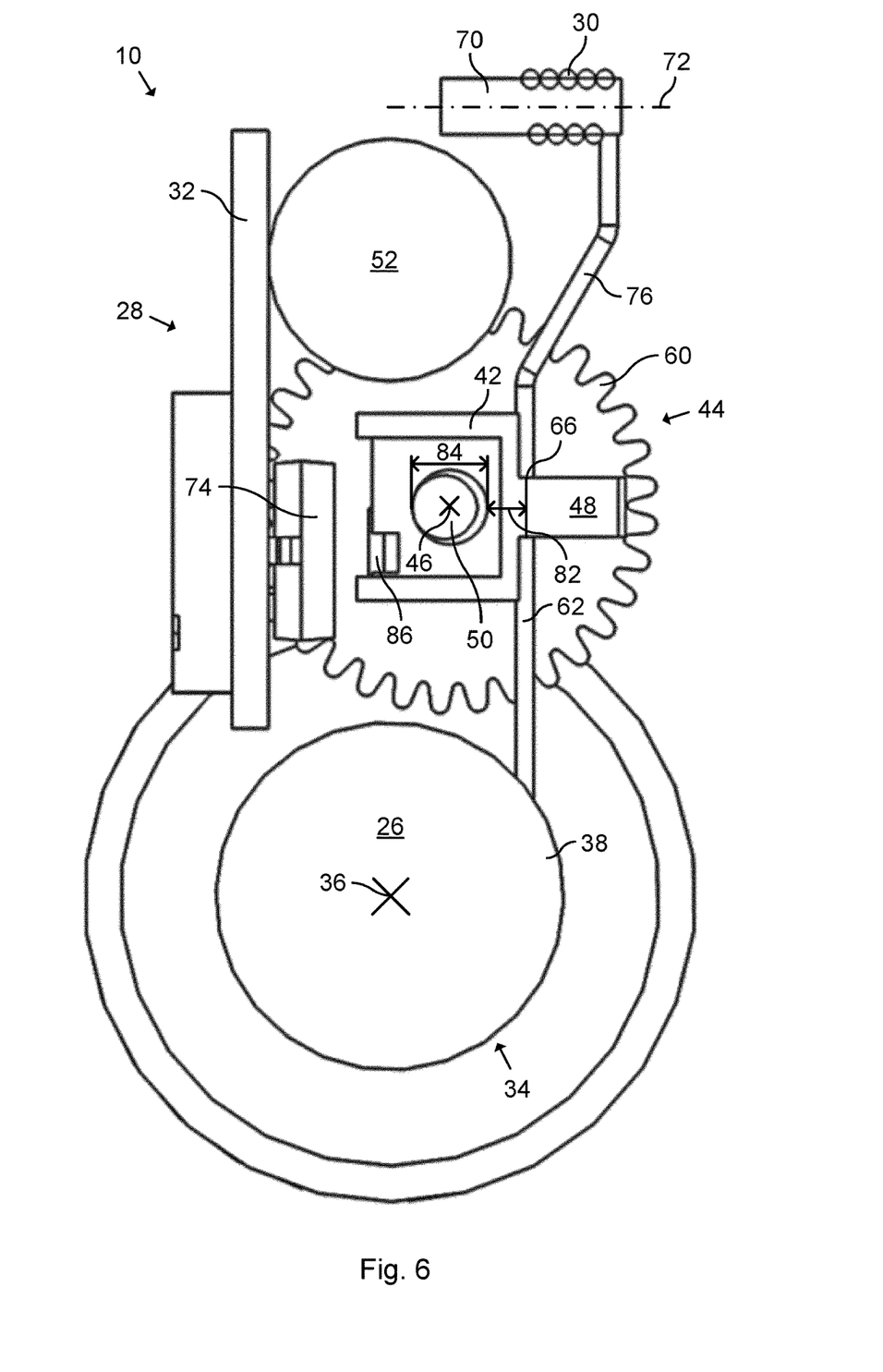
FIG. 6: schematically represents a cross-sectional front view of the arrangement in FIG. 2.

FIG. 6 schematically represents a cross-sectional front view of the arrangement 10 in FIG. 2. As shown in FIG. 6, a shortest distance between the spring axis 72 and the actuating axis 46 is approximately 50% of a shortest distance between the spring axis 72 and the coupling axis 36.

FIG. 6 further shows that a distance 82 between the first engagement point 66 and the lead screw 50 is approximately 50% of a diameter 84 of a major thread of the lead screw 50. Although not shown in FIG. 6, the same applies for the second engagement point 68. In this way, friction losses between the torsion spring 30, the nut 42 and the lead screw 50 can be reduced and the overall energy efficiency of the arrangement 10 can be improved. The positioning of the first engagement point 66 and the second engagement point 68 close to the actuating axis 46 also contributes to a compact design of the arrangement 10.

FIG. 6 further shows the magnet 86 provided on the nut 42. By sensing the magnetic field of the magnet 86 by the position sensors 74, it can be determined whether the nut 42 is in the uncoupling actuating position 44 or in the coupling actuating position 78.

Figure 7:
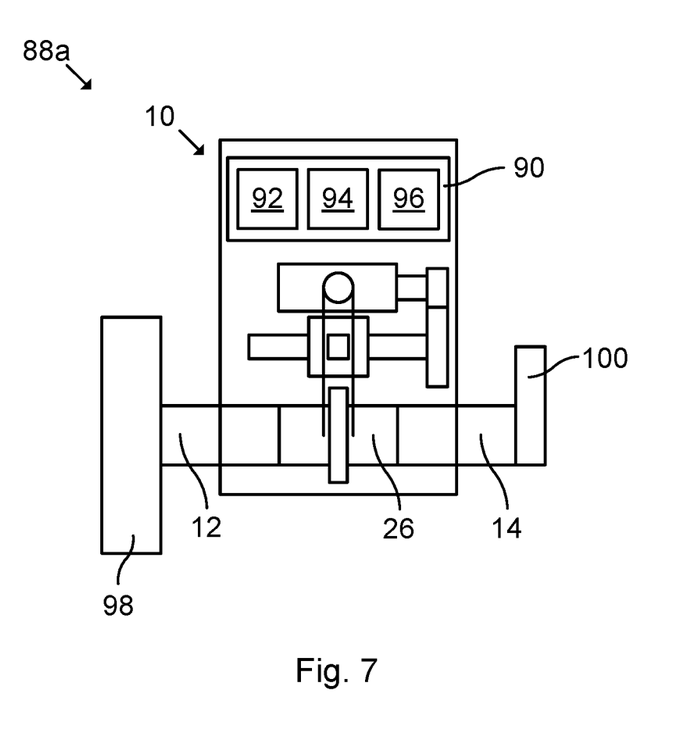
FIG. 7: schematically represents a side view of a lock device comprising the arrangement.

FIG. 7 schematically represents a side view of one example of a lock device 88*a* comprising the arrangement 10. The arrangement 10 further comprises a control system 90. The control system 90 of this example comprises a data processing device 92, a memory 94 and an antenna 96. The memory 94 has a computer program stored thereon. The computer program comprises program code which, when executed by the data processing device 92, causes the data processing device 92 to evaluate an authorization request received by the antenna 96, and to command the electric motor 52 to drive the nut 42 from the uncoupling actuating position 44 to the coupling actuating position 78 in response to a granted evaluation request. The authorization request may for example be received by the antenna 96 via Bluetooth Low Energy, BLE. Components of the control system 90 may be arranged on a common PCB, e.g. fixed to the plate 32.

The lock device 88*a* comprises a knob 98. The knob 98 is one example of a manually operable member according to the present disclosure. In this example, the knob 98 is fixed to the input shaft 12.

The lock device 88*a* further comprises a locking member 100. The locking member 100 of this example is fixed to the output shaft 14. When the coupling shaft 26 adopts the coupled position 80, a rotation of the knob 98 is transmitted to a rotation of the locking member 100 to unlock the lock device 88*a*.

Figure 8:
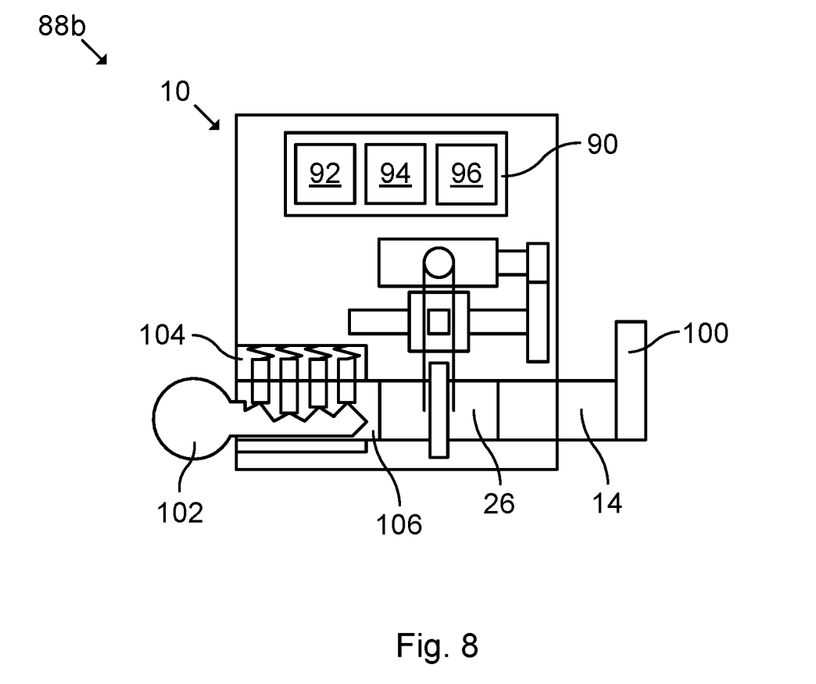
FIG. 8: schematically represents a side view of a further example of a lock device comprising the arrangement.

FIG. 8 schematically represents a side view of a further example of a lock device 88*b* comprising the arrangement 10. Mainly differences with respect to the lock device 88*a* in FIG. 7 will be described.

The lock device 88*b* of the example in FIG. 8 is a key cylinder lock. The lock device 88*b* comprises a key 102, an outer casing 104 and a plug 106 rotatably arranged in the outer casing 104. The plug 106 is a further example of an input member according to the present disclosure. Similarly to the input shaft 12, the plug 106 is connected to the coupling shaft 26 by means of a shape fit. By inserting a correct key 102 into the plug 106 and presenting a valid credential to the control system 90 such that the coupling shaft 26 moves from the uncoupled position 34 to the coupled position 80, a rotation of the key 102 is transmitted to a rotation of the locking member 100 to unlock the lock device 88*b*.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

What is claimed is:

1. An arrangement for a lock device, the arrangement comprising:
   an input member rotatable about an input axis;
   an output member rotatable about an output axis;
   a coupling member movable between an uncoupled position, in which the coupling member does not transmit a rotation of the input member to a rotation of the output member, and a coupled position, in which the coupling member transmits a rotation of the input member to a rotation of the output member;
   an electromechanical actuator comprising an actuating member linearly movable between an uncoupling actuating position and a coupling actuating position; and
   a torsion spring having a first leg and a second leg movable away from each other against a deformation of the torsion spring, wherein the actuating member is arranged to engage the first leg and the second leg is arranged to engage the coupling member when the coupling member is in the uncoupled position and the actuating member moves from the uncoupling actuating position to the coupling actuating position.

2. The arrangement according to claim 1, wherein the torsion spring is rotatable about a spring axis.

3. The arrangement according to claim 2, wherein the actuating member is linearly movable along an actuating axis, and wherein the actuating axis is substantially perpendicular to the spring axis.

4. The arrangement according to claim 2, wherein the actuating member is arranged to engage the first leg at a first engagement point, and wherein the first engagement point and the actuating axis lie in a plane substantially parallel with the spring axis.

5. The arrangement according to claim 2, wherein the coupling member is linearly movable between the uncoupled position and the coupled position along a coupling axis, and wherein the coupling axis is substantially perpendicular to the spring axis.

6. The arrangement according to claim 2, wherein the actuating member is positioned between the spring axis and the coupling member.

7. The arrangement according to claim 1, wherein the actuator comprises a lead screw, and wherein the actuating member is a nut engaging the lead screw.

8. The arrangement according to claim 7, wherein the actuating member is arranged to engage the first leg at a first engagement point, and wherein a distance between the first engagement point and the lead screw is less than a diameter of the lead screw.

9. The arrangement according to claim 1, wherein the coupling member is configured to engage the output member by means of a shape fit when the coupling member adopts the coupled position.

10. The arrangement according to claim 1, wherein the first leg and the second leg are substantially parallel when the actuating member adopts the uncoupling actuating position and the coupling member adopts the uncoupled position.

11. The arrangement according to claim 1, wherein each of the first leg and the second leg is substantially straight.

12. The arrangement according to claim 1, wherein the actuating member is arranged to engage the second leg and the first leg is arranged to engage the coupling member when the coupling member is in the coupled position and the actuating member moves from the coupling actuating position to the uncoupling actuating position.

13. The arrangement according to claim 1, wherein the coupling member comprises a protruding coupling part, and wherein the protruding coupling part is arranged between the first leg and the second leg.

14. The arrangement according to claim 1, wherein the actuating member comprises a protruding actuating part, and wherein the protruding actuating part is arranged between the first leg and the second leg.

15. A lock device comprising an arrangement according to claim 1.

16. The arrangement according to claim 1, wherein the first leg comprises a bent portion.

17. The arrangement according to claim 16, wherein the torsion spring comprises a helix, and wherein, except for the bent portion, the first leg is straight between the helix and the coupling member.

\* \* \* \* \*